United States Patent Office 3,377,360
Patented Apr. 9, 1968

3,377,360
KETALS OF Δ³-A-NORANDROSTENE-17β-OL-2-ONE AND Δ³ - A - NORPREGNENE - 2,20 - DIONE AND THEIR 3,5-DIHYDROXY DERIVATIVES
Seymour D. Levine, North Brunswick, and Patrick A. Diassi, Westfield, N.J., assignors, by mesne assignments, to E. R. Squibb & Sons, Inc., New York, N.Y., a corporation of Delaware
No Drawing. Original application Apr. 13, 1964, Ser. No. 359,417, now Patent No. 3,324,171, dated June 6, 1967. Divided and this application Nov. 14, 1966, Ser. No. 593,755
6 Claims. (Cl. 260—340.9)

ABSTRACT OF THE DISCLOSURE

This invention relates to the 2-ketal derivatives of Δ³-A-norandrostene-17β-ol-2-one and A-norandrostane 3β, 5β,17β-triol-2-one and the 2,20-bis-ketals of Δ³-A-norpregnene-2,20-dione and A-norpregnane-3β,5β-diol-2,20-dione. These compounds are useful as intermediates in preparing Δ³-A-norandrostene-2-one-3,17β-diol and Δ³-A-norpregnene-2,20-dione-3-ol, by treating the 3,5-dihydroxy derivatives with an acid to yield the free keto derivative and then with a dilute base to dehydrate the compound formed to yield the Δ³-3-hydroxy final product.

This application is a division of our application, Ser. No. 359,417, filed Apr. 13, 1964, now Patent No. 3,324,171.

This invention relates to the synthesis of steroids and has for its object the provision of a new class of physiologically active steroids, which may be represented by the formula

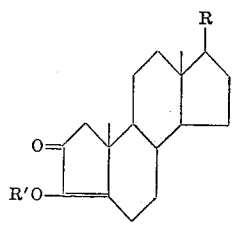

wherein R is β-acetyl, β-R'O or keto, and R' is hydrogen, the acyl radical of a hydrocarbon carboxylic acid of less than twelve carbon atoms, or an alkyl of less than twelve carbon atoms.

Those compounds of the above formula, wherein R is β-R'O or keto, are physiologically active substances which possess both androgenic and anabolic activities. Hence, these compounds can be used in lieu of known androgenic or anabolic steroids, such as testosterone, in the treatment of conditions which respond to such treatment, being formulated for such administration in the same type of parenteral preparations as testosterone, for example, with concentration and/or dosage based on the activity of the particular compound.

Those compounds of the above formula, wherein R is β-acetyl, are physiologically active substances which possess antiandrogenic activity. Hence, these compounds can be used in lieu of known antiandrogenic steroids, such as A-norprogesterone, in the treatment of hyperandrogenic acne, being formulated for such administration in topical preparations with concentration and/or dosage based on the activity of the particular compound.

The new compounds of this invention are prepared by either of two alternative methods. In the first method, A-nortestosterone or A-norprogesterone is converted to its 2-ketal or 2,20-diketal derivative, respectively, by reacting with a 1,2- or 1,3-dihydric alcohol, such as ethylene glycol and propylene glycol, in the presence of an acid catalyst, such as p-toluenesulfonic acid and perchloric acid. The reaction is preferably conducted in the presence of an organic solvent, such as benzene, for the steroid reactant, at an elevated temperature, such as the reflux temperature of the solvent.

This first step of the process of this invention yields new intermediates of this invention of the formula

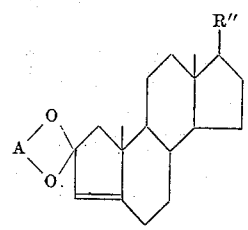

wherein R" is the ketal of β-acetyl with the dihydric alcohol or β-hydroxy, and A is lower alkylene, preferably ethylene or 1,2-propylene.

The ketals are then reacted with osmium tetroxide in the presence of a base, such as an organic base (e.g., pyridine). The reaction is preferably carried out in the presence of an organic solvent for the steroid reactant, such as benzene, at any normal temperature, such as ambient temperature.

This second step of the process yields new intermediates of this invention of the formula

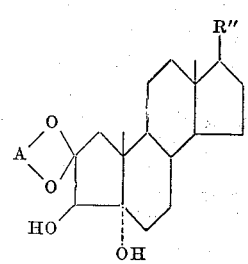

wherein R" and A are as hereinbefore defined.

The 3β,5β-dihydroxy intermediates are then hydrolyzed in the usual manner, as by treatment with a dilute aqueous acid, such as p-toluenesulfonic acid and sulfuric acid, preferably in the presence of an organic solvent for the steroid reactant at an elevated temperature, such as the reflux temperature of the solvent.

This third step of the process yields new intermediates of this invention of the formula

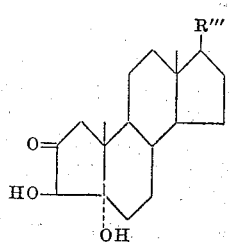

wherein R''' is β-acetyl or β-hydroxy.

The resulting 3β,5β-dihydroxy compound is then dehydrated by treatment with a dilute base, such as an alkali metal hydroxide (e.g. potassium hydroxide) to yield the corresponding Δ³-3-hydroxy final products of this invention, wherein R is β-acetyl or β-hydroxy and R' is hydrogen.

The following examples are illustrative of the invention (all temperatures being in centigrade):

Example 1.—Δ³-A-norandrostene-17β-ol-2-one 2-ethylene ketal

A mixture of 4 g. of A-nortestosterone and 65 mg. of p-toluenesulfonic acid is stirred and refluxed in 250 ml. of benzene and 40 ml. of ethylene glycol for seven days and the water removed by a calcium carbide trap. The benzene layer is separated, and the ethylene glycol layer is diluted with water and extracted with additional benzene. The combined benzene extracts are washed in 8% salt solution, dried over sodium sulfate and evaporated to dryness. The residue is crystallized from isopropyl ether and gives about 2.45 g. of Δ³ - A - norandrostene-17β - ol - 2 - one 2 - ethylene ketal, M.P. about 149.5–150.5°; $[\alpha]_D^{22}+29°$ (ethanol);

$\lambda_{max}^{KBr}$ 2.88, 6.03, 8.83, 9.07, 9.26, and 9.53μ
$\gamma^{Si(CH_3)_4}$ 9.22 (s, 18-Me), 8.96 (s, 19-Me), 6.32 (m, 17-H), 6.05 (s, ketal methylenes) and 4.73 (d, J= 1 cps., 3-H).

Analysis.—Calc'd. for $C_{20}H_{30}O_3$ (318.44): C, 75.43; H, 9.50. Found: C, 75.52; H, 9.47.

Example 2.—Δ³-A-norpregnene-2,20-dione 2,20-bis-ethylene ketal

Following the procedure in Example 1 but substituting A-norprogesterone for A-nortestosterone there is obtained Δ³-A-norpregnene-2,20-dione 2,20 - bis - ethylene ketal.

Similarly, if propylene glycol is substituted for the ethylene glycol in the procedures of Examples 1 and 2, the corresponding 2-propylene ketal and 2,20-bis-propylene ketal derivatives are obtained, respectively.

Example 3.—A-norandrostane-2-one-3β,5β,17β-triol 2-ethylene ketal

A mixture of 50 mg. of Δ³ - A - norandrostene - 17β-ol-2-one 2-ethylene ketal and 47 mg. of osmium tetroxide in 0.4 ml. of pyridine and 10 ml. of benzene is stirred at room temperature for 89 hours. The reaction mixture is evaporated to dryness and the residue dissolved in 8 ml. of chloroform and stirred with 16 ml. of a 1% potassium hydroxide solution containing 1.6 g. of mannitol for 3 hours. The chloroform layer is separated and dried over sodium sulfate. Evaporation gives about 54 mg. of A-norandrostane - 2 - one - 3β,5β,17β - triol 2-ethylene ketal having a melting point of 204–207°. The analytical sample is prepared by recrystallization from benzene, M.P. about 208–209°, $[\alpha]_D^{22}+46°$ (ethanol);

$\lambda_{max}^{KBr}$ 2.90, 3.00μ
$\gamma^{Si(CH_3)_4}$ 9.25 (s, 18-Me), 9.01 (s, 19-Me), 6.37 (m, 17-H) and 6.04 (s, ketal methylenes).

Analysis.—Calcd. for $C_{20}H_{32}O_5$ (352.46): C, 68.15; H, 9.15. Found: C, 68.19; H, 9.13.

Example 4.—A-nonpregnane-2,20-dione-3β,5β-diol 2,20-bis-ethylene ketal

Following the procedure in Example 3 but substituting Δ³-A-norpregnene-2,20-dione 2,20-bis-ethylene ketal for Δ³ - A - norandrostene - 17β - ol - 2 - one 2-ethylene ketal there is obtained A-norpregnane-2,20-dione-3β,5β-diol 2,20-bis-ethylene ketal.

Example 5.—A-norandrostane-2-one-3β,5β,17β-triol

A mixture of 225 mg. of A-norandrostane-2-one-3β,5β,17β-triol 2-ethylene ketal, 17 mg. of p-toluenesulfonic acid, 2 ml. of water and 8 ml. of acetone is refluxed for 5 hours. The reaction mixture is evaporated to dryness and diluted with water. The aqueous phase is extracted three times with ethyl acetate, and the ethyl acetate extracts are washed with a saturated sodium bicarbonate solution and 8% salt solution, dried over sodium sulfate and evaporated to dryness. Crystallization of the residue from ethyl acetate gives about 56 mg. of A-norandrostane-2-one-3β,5β,17β-triol having a melting point of about 202–204°. Recrystallization from ethyl acetate gives the analytical sample having M.P. about 206–207°; $[\alpha]_D^{22}-40°$ (EtOH);

$\lambda_{max}^{KBr}$ 2.86, 2.93, and 5.75μ
$\gamma^{Si(CH_3)_4}$ 9.20 (s, 18-Me), 8.85 (s, 19-Me), 6.35 (m, 17-H), and 5.55 (s, 3-H).

Analysis.—Calcd. for $C_{18}H_{28}O_4$ (308.42): C, 70.10; H, 9.15. Found: C, 70.20; H, 9.11.

Example 6.—A-norpregnane-2,20-dione-3β,5β-diol

Following the procedure of Example 5 but substituting A-norpregnane-2,20-dione-3β,5β-diol 2,20 - bis - ethylene ketal for A-norandrostane-2-one-3β,5β,17β-triol 2-ethylene ketal there is obtained A-norpregnane-2,20-dione-3β,5β-diol.

Example 7.—Δ³-norandrostene-2-one-3,17β-diol (1) A mixture of 1.18 g. of A-nortestosterone and 1 g. of osmium tetroxide in 1 ml. of pyridine and 20 ml. of benzene is stirred at room temperature for 65½ hours. The reaction mixture is evaporated to dryness and the residue is dissolved in 100 ml. of chloroform and stirred with 200 ml. of a 1% potassium hydroxide solution containing 20 g. of mannitol for 2½ hours. The layers are separated and the aqueous phase is acidified with hydrochloric acid and extracted five times with chloroform. The chloroform extracts are dried over sodium sulfate and evaporated to dryness. Crystallization of the residue from acetone-hexane gives about 292 mg. of Δ³-A-norandrostene-2-one-17β-diol having a melting point of 254.5–255.5°. Recrystallization from acetone-hexane gives the analytical sample having M.P. about 259–260°; $[\alpha]_D^{22}=+43°$ (EtOH);

$\lambda_{max}^{KBr}$ 2.93, 3.18, 5.87, and 6.02μ; $\lambda_{max}^{EtOH}$ 265mμ (ε=12,700)
$\gamma^{Si(CH_3)_4}$ 9.19 (s, 18-Me), 8.83 (s, 19-Me), 6.33 (m, 17-H), 4.63 (s, 3-OH).

Analysis.—Calcd. for $C_{18}H_{26}O_3$ (290.39): C, 74.44; H, 9.03. Found: C, 74.31; H, 9.01.

(2) A solution of 24 mg. of A-norandrostane-2-one-3α,5α,17β-triol in 5 ml. of chloroform is stirred with 10 ml. of a 1% potassium hydroxide solution containing 1 g. of mannitol for 3 hours. The workup procedure described in Example 7, part 1, is employed and gives Δ³-A-norandrostene-2-one-3,17β-diol.

Example 8.—Δ³-A-norpregnene-2,20-dione-3-ol

Following the procedures of Example 7, but substituting A-norprogesterone for A-nortestosterone in part 1 or A-norpregnane-2,20-dione-3α,5α-diol for A-norandrostane-2-one 3α,5α,17β-triol in part 2, there is obtained Δ³-A-norpregnene-2,20-dione-3-ol.

What is claimed is:
1. A compound of the formula

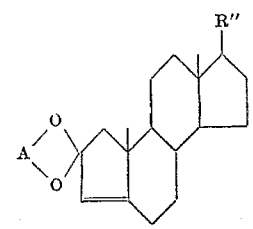

wherein R″ is selected from the group consisting of the ketal of β-actyl with a lower alkanediol and β-hydroxy, and A is lower alkylene.

2. The compound of claim 1 having the name Δ³-A-norandrostene-17β-ol-2-one 2-ethylene ketal.

3. The compound of claim 1 having the name Δ³-A-norpregnene-2,20-dione 2,20-bis-ethylene ketal.

4. A compound of the formula

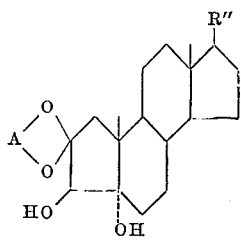

wherein R'' is selected from the group consisting of the ketal of β-acetyl with a lower alkanediol and β-hydroxy, and A is lower alkylene.

5. The compound of claim 4 having the name A-norandrostane-2-one-3β,5β,17β-triol 2-ethylene ketal.

6. The compound of claim 4 having the name A-norpregnane-2,20-dione-3β,5β-diol, 2,20-bis-ethylene ketal.

References Cited

UNITED STATES PATENTS 3,346,617  10/1967  Levine et al. ____ 260—340.9 X

ALEX MAZEL, *Primary Examiner.*

J. H. TURNIPSEED, *Assistant Examiner.*

UNITED STATES PATENT OFFICE
CERTIFICATE OF CORRECTION

Patent No. 3,377,360                                April 9, 1968

Seymour D. Levine et al.

It is hereby certified that error appears in the above numbered patent requiring correction and that the said Letters Patent should read as corrected below.

Column 2, line 20, "diyhdric" should read -- dihydric --; lines 32 to 42, the formula should appear as shown below:

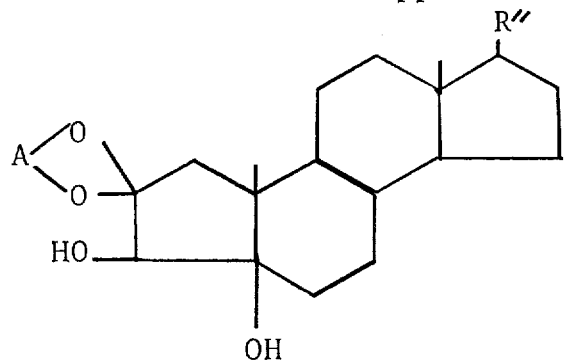

lines 55 to 64, the formula should appear as shown below:

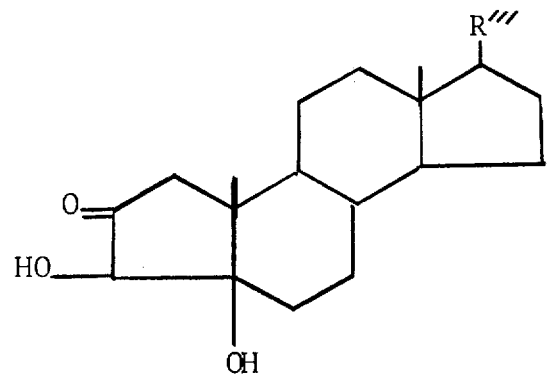

Column 3, line 53, "γ" should read -- τ --. Column 4, line 19, "Δ³-norandrostene" should read -- Δ³-A-Norandrostene --; line 33, "17β-diol" should read -- 3,17β-diol --; line 37, "γSi(CH₃)₄" should read -- τSi(CH₃)₄ --; line 43, "3α, 5α," should read -- 3β, 5β, --; line 74, "β-actyl" should read -- β-acetyl --; Column 5, lines 6 to 15, the formula should appear as shown below:

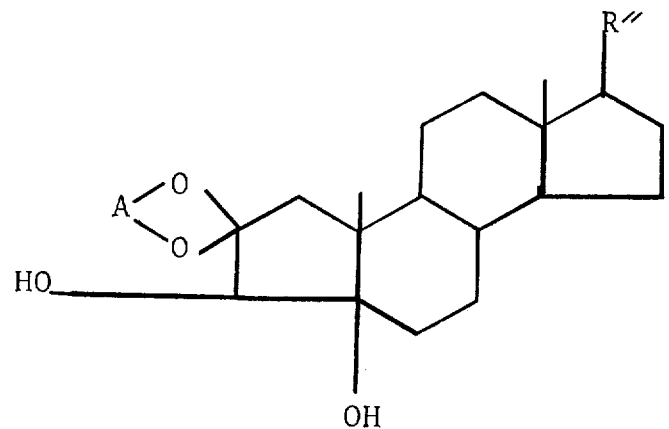

Signed and sealed this 23rd day of September 1969.

(SEAL)
Attest:

EDWARD M. FLETCHER, JR.
Attesting Officer

WILLIAM E. SCHUYLER, JR.
Commissioner of Patents